United States Patent [19]

Urban

[11] Patent Number: 4,813,516
[45] Date of Patent: Mar. 21, 1989

[54] LUBRICATION SYSTEM FOR DRUM BRAKES

[75] Inventor: John A. Urban, Plainwell, Mich.

[73] Assignee: Lucas Industries Public Limited Company, Birmingham, England

[21] Appl. No.: 133,004

[22] Filed: Dec. 15, 1987

[51] Int. Cl.[4] ............... F16D 51/00; F16D 65/78; F16D 13/60

[52] U.S. Cl. ................. 188/79.55; 188/264 B; 192/113 B

[58] Field of Search ............... 188/264 B, 72.7, 72.9, 188/329, 330, 343, 209, 79.5 K, 79.5 GE, 196 BA, 79.55, 79.62; 192/70.23, 113 B; 74/587, 605

[56] References Cited

U.S. PATENT DOCUMENTS

| | | | |
|---|---|---|---|
| 1,453,050 | 4/1923 | Link | 188/264 B |
| 2,064,103 | 12/1936 | Burdick | 188/329 |
| 3,876,027 | 4/1975 | Crise | 192/113 B X |
| 4,256,208 | 3/1981 | Najer et al. | 188/79.55 X |
| 4,380,277 | 4/1983 | Ingram et al. | 188/329 |
| 4,502,572 | 3/1985 | Davidson et al. | 188/264 B X |
| 4,720,000 | 1/1988 | Snyder | 188/264 B X |

FOREIGN PATENT DOCUMENTS 1208569 1/1966 Fed. Rep. of Germany ... 188/264 B

Primary Examiner—Andres Kashnikow
Assistant Examiner—Robert J. Oberleitner
Attorney, Agent, or Firm—Harness, Dickey & Pierce

[57] ABSTRACT

A drum-type brake and actuating system therefor comprised of a camshaft, cam and actuator mechanism that are contained within an actuator housing and a tubular shaft which journals the camshaft. A lubricant fitting permits lubricant to be introduced into both the tubular member and the actuator housing. In addition, an automatic adjuster is contained within an adjuster housing which communicates with the actuator housing and a pressure responsive valve that permits lubricant introduced through a grease fitting to be discharged from the adjuster housing. An expandable member is contained within the actuator housing for compensating for effective volume variations and precluding the exhaust of lubicant and the introduction of air during such changes.

17 Claims, 7 Drawing Sheets

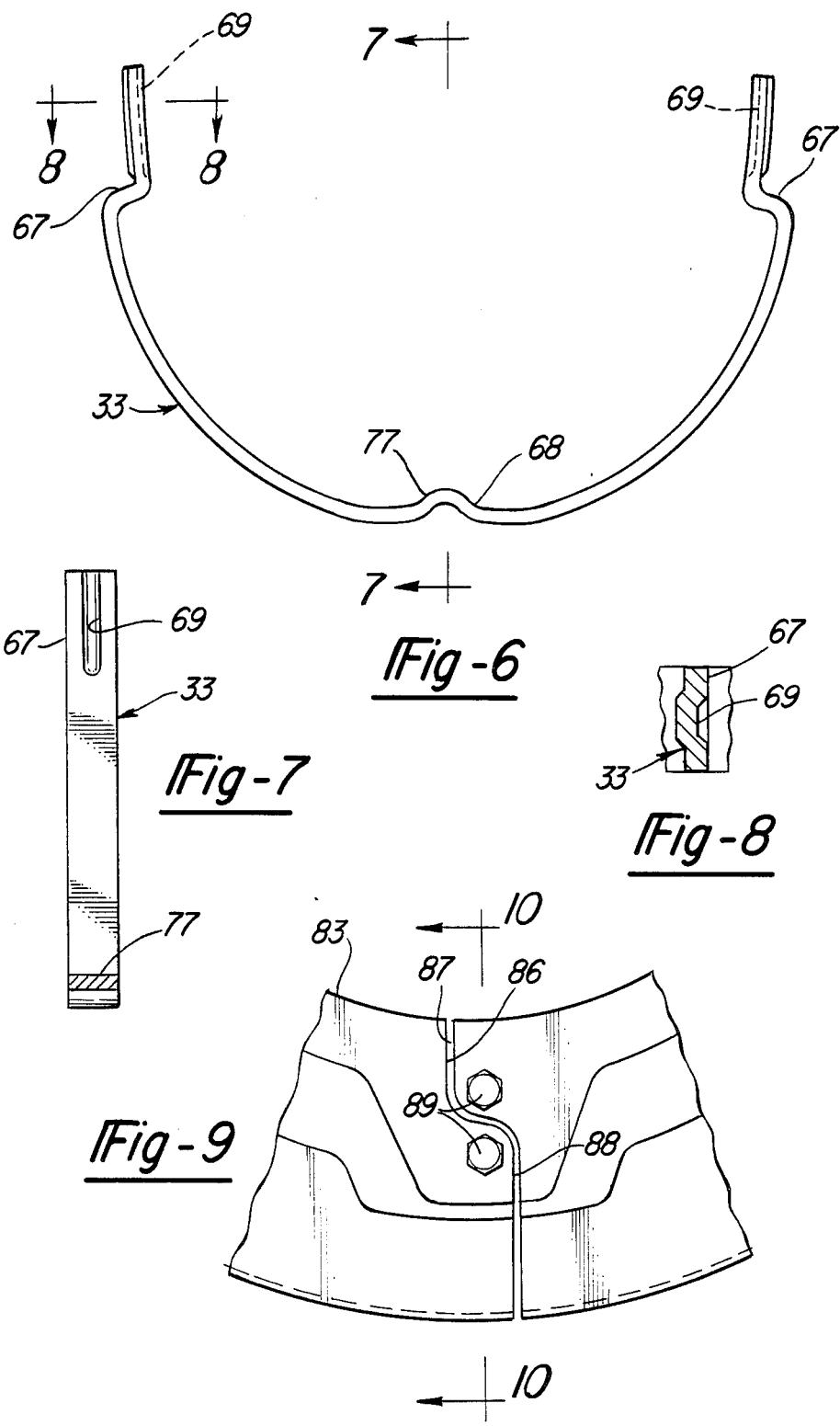

LUBRICATION SYSTEM FOR DRUM BRAKES

BACKGROUND OF THE INVENTION

This invention relates to a lubrication system for drum-type brakes and more particularly to an improved system for lubricating the actuating mechanism for a cam actuated drum-type brake.

U.S. Pat. No. 4,380,277, entitled "Automatic Slack Adjuster For Vehicle Shoe-Drum Brakes", issued Apr. 19, 1983 in the name of Brian Ingram et al and assigned to the assignee of this application, shows a very popular and successful type of brake. In this brake, a pair of brake shoes are operated by means of a cam that is rotatably journaled relative to a backing plate and which operate a pair of struts which, in turn, transfers thrust to the brake shoes through a pair of adjustable tappet assemblies. With this type of mechanism, it has been the practice to provide a grease fitting for lubricating the camshaft. The cam itself and the associated actuating mechanism is, however, lubricated by removing a cover plate of the actuator housing and packing this mechanism with grease. Although such an arrangement is satisfactory, the removal of the cover plate for replacing the lubricant gives rise to the possibility of contamination. When the cover plate is removed, foreign material may enter into the actuator housing and damage could result. Furthermore, when the cover plate is removed for lubrication purposes, there is always the danger that the internal components may be removed and improperly reassembled.

It is, therefore, a principle object of this invention to provide an improved lubricating system for the actuating mechanism of a drum type brake.

It is a further object of this invention to provide an improved lubricating system for a cam actuated brake wherein the cam, associated actuating mechanism and camshaft can all be lubricated at the same time without necessitating disassembly.

It is a still further object of this invention to provide a lubricating system of the type aforedescribed in which an automatic adjusting mechanism is also lubricated at the same time the remaining components are lubricated and without necessitating opening of the system.

In connection with many types of brakes that embody cam actuators and automatic adjusting mechanism, the internal volume of the actuator hosuing will vary during use. For example, in the brake of the type shown in aforenoted U.S. Pat. No. 4,380,277, as the brakes become worn, the adjusting tappets are extended and may displace some of the volume within the actuator housing. In addition, when the brake is actuated, the internal volume of the housing varies as the tappets slide from their retracted to their extended position. Such changes in volume can cause pressure differences within the housing which can either force lubricant from the housing to escape, if the volume decreases, or air to enter the housing if the effective volume increases. Neither condition is desirable.

It is, therefore, a still further object of this invention to provide an arrangement that ensures against the loss of lubricant or the ingress of air during changes in effective volume of the actuator housing of a brake of this type.

SUMMARY OF THE INVENTION

A first feature of this invention is adapted to be embodied in an actuator mechanism for a drum brake or the like that comprises a torque plate that is adapted to be fixed relative to a rotating component to be braked. A tubular member is fixed relative to the torque plate and rotatably journals a camshaft. An actuator housing is fixed at one end relative to the tubular member and defines an internal cavity in communication with the interior of the tubular member. Cam means are fixed relative to the camshaft and extend at least in part into the actuator housing cavity. Actuator means are movably supported within the actuator housing and are adapted to actuate an associated brake shoe. Means are provided for permitting lubricant into the cavity and into the interior of the tubular member for lubricating the actuator means, the cam and the camshaft. A relief opening is provided for permitting air and lubricant under pressure to escape from the actuator housing cavity and tubular member upon pressure lubrication.

Another feature of the invention is also adapted to be embodied in an actuator mechanism for a drum brake or the like that comprises a torque plate that is adapted to be affixed relative to a rotating component of the brake. A tubular member is fixed relative to the torque plate and a camshaft is journaled for rotation within the tubular member. An actuator housing is fixed at one end to the tubular member and defines an internal cavity in communication with the interior of the tubular member. Cam means are fixed relative to the camshaft and extend at least in part into the actuator housing cavity. Actuator means are movably supported within the actuator housing cavity and are adapted to actuate an associated brake shoe. The cavity and interior of the tubular member around the camshaft are adapted to be filled with a lubricant and the volume of this area varies during the brake operation. In accordance with this feature of the invention, an expandable member is contained within the cavity and is adapted to compress on a decrease in the effective volume and increase on an increase in the effective volume so as to avoid lubricant being forced from the volume when the volume decreases and to avoid the ingress of air when the effective volume increases.

BRIEF DESCRIPTION OF THE DRAWINGS

FIG. 6 is an elevational view showing the return spring in a non-installed condition.

FIG. 7 is a cross-sectional view taken along the line 7—7 of FIG. 6.

FIG. 8 is an enlarged cross-sectional view taken along the line 8—8 of FIG. 6.

FIG. 9 is an enlarged view taken in the direction of the arrow 9 in FIG. 2 and shows the method of attachment of the dirt shield.

DETAILED DESCRIPTION OF THE PREFERRED EMBODIMENTS

Figure 1:
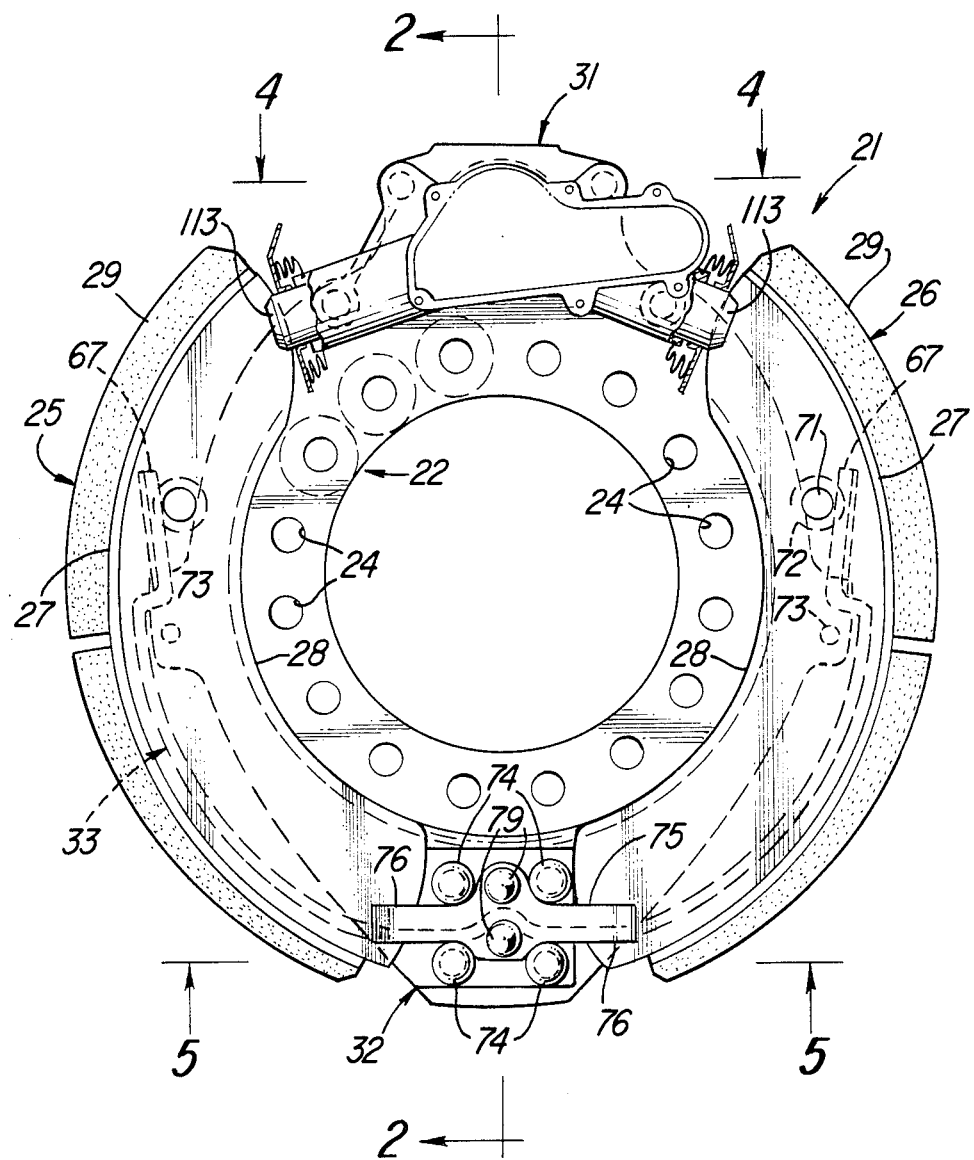
FIG. 1 is an elevational view of drum-type brake constructed in accordance with an embodiment of the invention, with the drum removed to more clearly show the construction.

Referring first to FIG. 1, a drum-type brake constructed in accordance with an embodiment of the invention is identified generally by the reference numeral 21. The brake 21 is comprised of a backing or torque plate, indicated generally by the reference numeral 22, that has a central opening 23 defining a flange in which openings 24 are formed for mounting of the backing plate 22 to an axle assembly (not shown) of a vehicle in a known manner. It should be understood that although the invention is described in conjunction with a vehicular application for the brake 21, the invention is susceptible for use with other applications.

Slidably supported relative to the backing plate 22 in a manner to be described, are a pair of brake shoes 25 and 26. The brake shoes 25 and 26 each include a shoe portion 27 having a web 28 and which shoe portion 27 carries a frictional lining material 29. When the brake shoes 25 and 26 are actuated, the frictional linings 29 will move into frictional engagement with an associated brake drum (shown only partially in FIG. 2 at 30) for braking the rotation of the brake drum and the associated wheel.

An actuator mechanism, indicated generally by the reference numeral 31 is incorporated for actuating the brake shoes 25 and 26 in a manner which will be described. The actuator mechanism 31 is interposed between adjacent ends of the brake shoe webs 28. A fixed abutment assembly, indicated generally by the reference numeral 32, is disposed between the opposite ends of the brake shoe webs 28.

A formed return spring, indicated generally by the reference numeral 33, is carried by the fixed abutment 32 in a manner to be described and cooperates with the brake shoes 25 and 26 in a manner also to be described so as to urge the brake shoes 25 and 26 to their released or retracted position when the actuator 31 is no longer energized.

Figure 2:
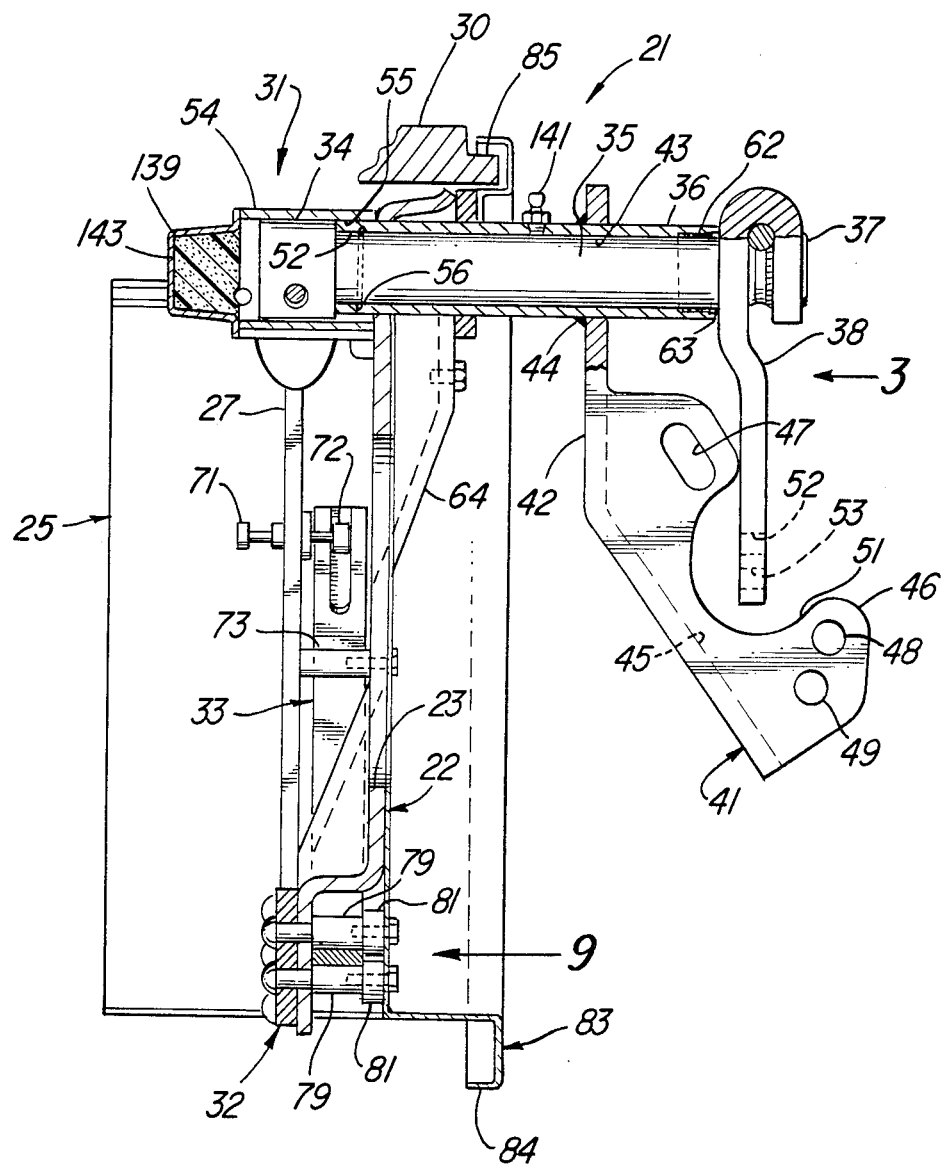
FIG. 2 is a cross-sectional view taken along line 2—2 of FIG. 1.
Figure 3:
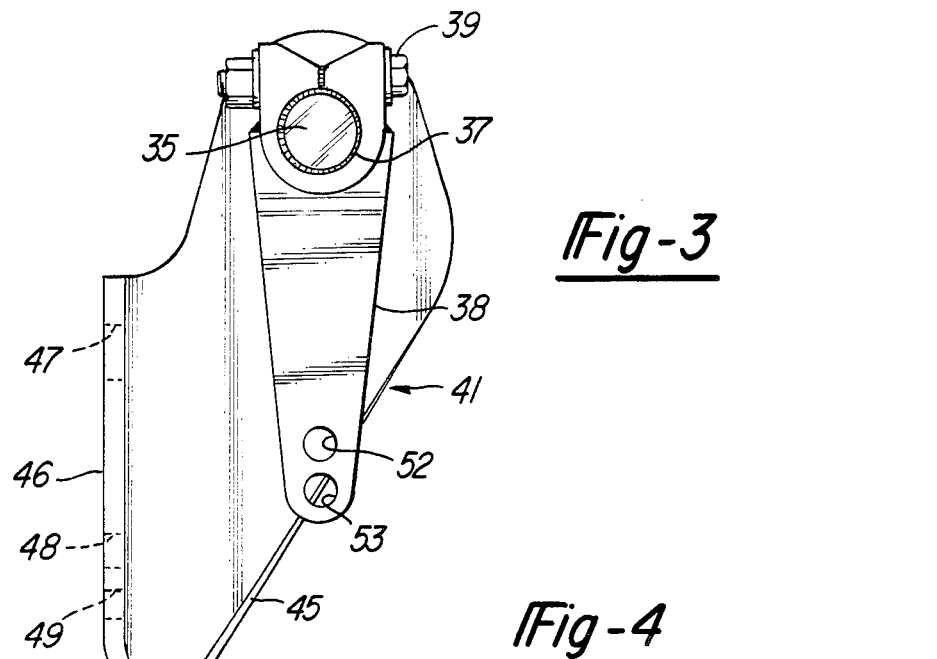
FIG. 3 is a side-elevational view showing the brake activating lever and power unit mounting bracket and is taken generally in the direction of arrow 3 in FIG. 2.

Referring now primarily to FIGS. 2 and 3, the actuator 31 comprises a cam 34 that is affixed to or formed integrally with a camshaft 35. The camshaft 35 is rotatably supported within a tubular member 36 for rotation about an axis that is parallel to and offset from the axis of rotation of the associated brake drum 30. The camshaft 35 has a serrated or splined end 37 which extends outwardly from beyond the tubular member 36 on the side of the backing plate 22 away from the brake shoes 25 and 26. An actuating lever 38 is affixed on this serrated or splined end 37 by means of a clamping bolt 39.

A mounting bracket, indicated generally by the reference numeral 41, is provided for carrying a power unit (not shown) such as an air chamber device for operating the lever 38 and rotating the camshaft 35 to actuate the brakes, in a manner to be described. The mounting bracket 41 may be conveniently formed from sheet metal and has a first leg 42 that is apertured at 43 so as to pass the tubular member 36. The bracket leg 42 is affixed to the tubular member 36 as by a weld 44.

The bracket leg 42 extends in a plane that is perpendicular to the axis of rotation of the brake drum. A second leg 45 is integrally connected to the leg 42 and extends at an angle to the leg 42 and also at an angle to the axis of rotation of the associated brake drum 30. An off-turned flange 46 is integrally formed with the legs 42 and 45 and extends generally perpendicularly to these two legs and generally parallel to the axis of rotation of the brake drum.

The flange 46 is formed with an elongated aperture 47 and a pair of apertures 48 and 49 so as to permit mounting of various size air chambers or power units to the mounting bracket 41 or to permit mounting at different distances from the axis of the camshaft 35. The area between the elongated aperture 47 and the apertures 48 and 49 is relieved at 51 so as to pass the actuator rod which is connected to one of selected apertures 52 and 53 in the lever 38 for actuating the lever 38 and camshaft 35 in a known manner.

It should be noted that the plane defined by the aperture 47 and either the aperture 48 or the aperture 49 is disposed at an angle to a plane perpendicular to the axis of rotation of the brake drum 30 and also at an angle to the axis of rotation of the brake drum 30 so as to reduce the likelihood of breakage or weakening due to harmonic vibrations along the axis of rotation or perpendicular to that axis. Also, the orientation will facilitate removal or installation of the fasteners that hold the power device to the mounting bracket 41 without interferring with the lever 38 or other components for facilitating servicing.

Figure 14:
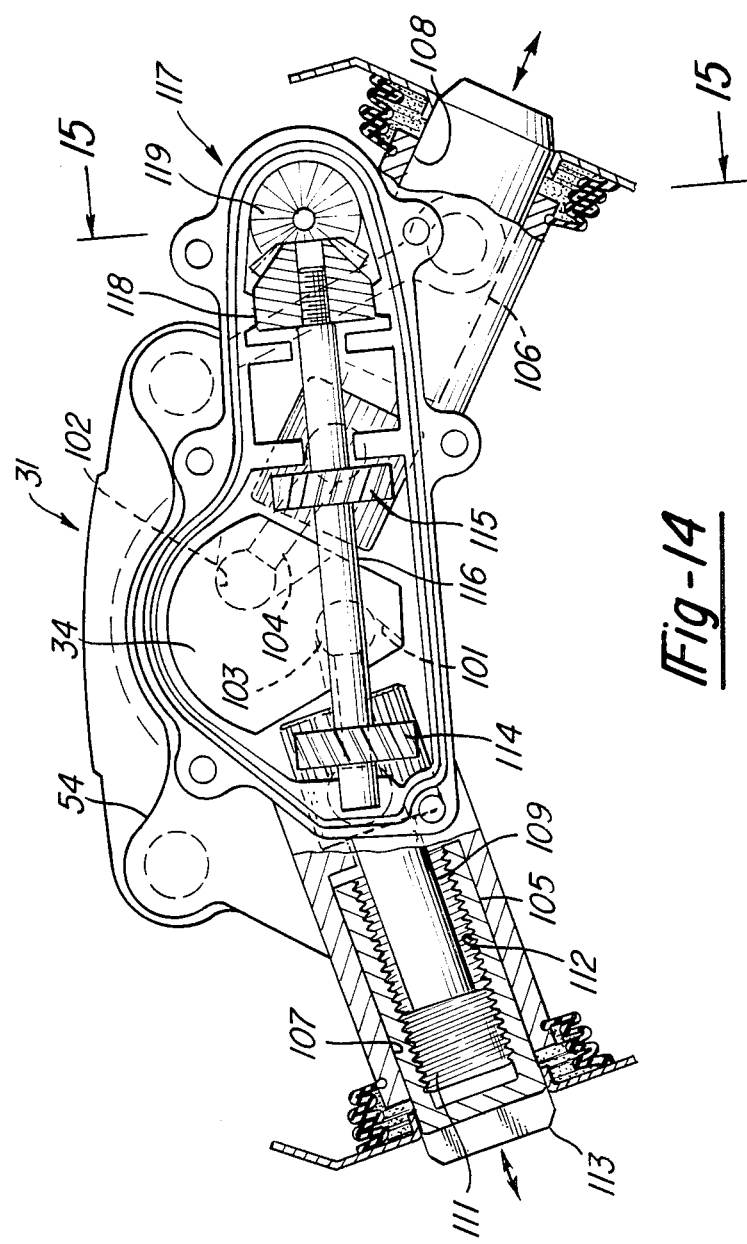
FIG. 14 is an enlarged elevational view, with portions removed and broken away, showing the actuator mechanism.
Figure 15:
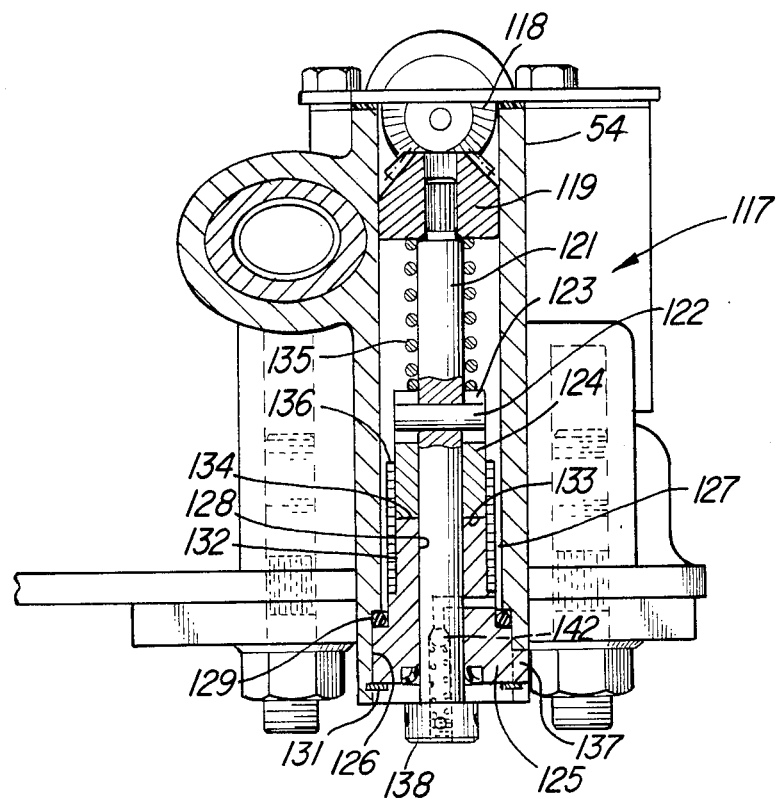
FIG. 15 is a cross-sectional view taken along the line 15—15 of FIG. 14.

The cam 34 is contained within an actuator housing 54 in which the actuator mechanism 31, to be described in conjunction with FIGS. 14 and 15, is contained. The actuator housing 54 is provided with a cylindrical bore 55 into which a reduced diameter end of the tubular member 36 opposite to the lever 38 is fitted. An O-ring seal 56 is contained at this joint to provide a fluid-tight seal.

Figure 4:
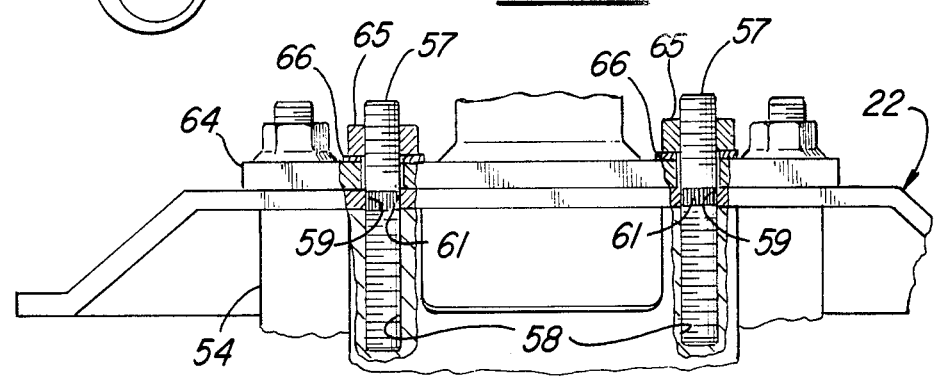
FIG. 4 is an enlarged cross-sectional view taken along the line 4—4 of FIG. 1.

The method of assembly and attachment will now be described by particular reference to FIG. 4. The cam 34, camshaft 35 and actuator components, to be described hereinafter, are inserted within the actuator housing 54. Studs 57 are threaded into tapped openings 58 formed in the housing 54. This threaded connection has an interference fit so that once the studs 57 are fully inserted, they will be retained within the housing 54. Alternatively, free running threads with an adhesive or locking compound can be used. The entire assembly is then assembled onto the backing plate 22 with the studs 57 extending through enlarged openings 59 formed in the backing plate 22. It should be noted that the studs 57 have serrated portions 61 which are spaced outwardly on the brake shoe side of the backing plate 22 during initial assembly.

The tubular member 36 is then inserted over the camshaft 35 into the tight fitting bore of the backing plate 22 and into the bore 55 of the housing 54. It should be noted that the tubular member 36 is provided with spaced bushings or bearings 62 that rotatably journal the camshaft 35 at its opposite ends. In addition, a lip-type seal 63 is provided at the outer end of the tubular member 36 so as to prevent the ingress of foreign material to the interior of the housing assembly.

The tubular member 36 has affixed to it, as by welding, a flange 64. The flange 64 is formed with apertures that pass the studs 57. Nuts 65 and lock washers 66 are then inserted over the studs 57 and threaded in place. As the nuts 65 are tightened, the flange 64 and tubular member 36 will be moved axially toward the backing plate 22 and the tubular member 36 will then sealingly engage the bore 55 of the housing 54. Once the bracket 64 engages the backing plate 22, further tightening of the nuts 65 will draw the housing 54 toward the backing plate 22 and the serrated portion 61 of the studs 57 will engage and lock with the torque plate 22 so as to form a rigid assembly. Once fully seated, nut 65 will retain the parts together and the housing 54 and contained components will then be locked to the backing plate 22.

The tubular member 36 may be subsequently removed by removal of the nuts 65 once the lever 38 has been removed so that the components may be serviced. During such removal, the housing 54 will be held in place by the serrated portion 61 of the studs 57 and, hence, it will be possible to remove the tubular member 36, mounting bracket 41 and power unit without removing the brake drum unlike prior art constructions.

As has been noted, a formed return spring 33 is provided for urging the brake shoes 25 and 26 to their retracted position against the operation of the actuator 31. As may be best seen in FIG. 6, the return spring 33 has a generally C-shape and is comprised of a pair of end sections 67 and an intermediate section 68. With prior art constructions, the intermediate section 68 has been permanently staked to the anchor 32. Where the intermediate portion is permanently staked to the anchor 32, this has the effect of substantially increasing the spring rate and makes assembly and disassembly of the brake shoes 25 and 26 of servicing difficult. In addition, the prior art type of constructions using such formed return springs have had the tendency to effect tilting or cocking movement of the brake shoes 25 and 26. Because of this cocking action, the shoes tend to assume a non-parallel relationship with the braking surfaces of the associated drum. The resultant variations in shoe to drum clearance may cause unequal lining wear to occur or even brake drag. All of these disadvantages are avoided in connection with the described return spring and anchoring arrangement.

The return spring end portions 67 are formed, as may be best seen in FIGS. 7 and 8, with a circumferentially extending groove or recess 69. In the illustrated embodiment, the recess 69 is formed by an indented portion of the ends 67. However, it should be understood that a slot may serve a similar purpose.

Affixed to each of the brake shoe web portions 27 is a post 71 (FIG. 2). The post 71 has an enlarged headed portion 72 that is received within the recess 69 so as to engage the brake shoe both axially and radially. The distances between the shoe webs 27 and engagement of the spring ends 67 with the post enlarged portion 72 holds the brake shoe webs 27 in engagement with respective steady posts 73 that are affixed to the backing plate 22 and backing plate surfaces adjacent the fixed abutment 32 so as to assist in the axial positioning of the brake shoes 25 and 26 and maintaining them parallel to the backing plate 22. It should be noted that the post is provided with enlarged portions 72 that extend on opposite sides of the webs 27 so that a given brake shoe can be used on either side of the actuator 31 and fixed abutment 32.

Figure 5:
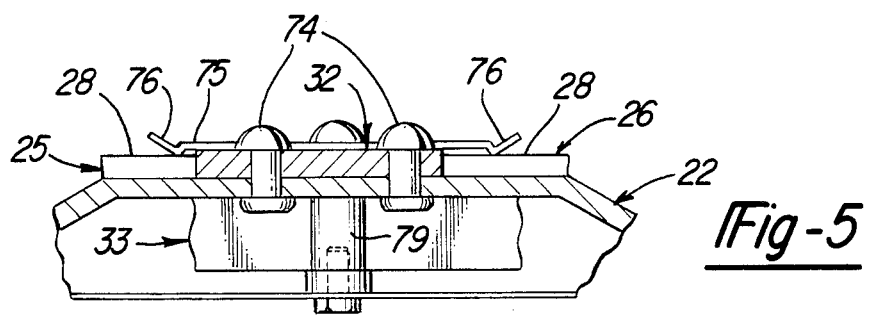
FIG. 5 is an enlarged cross-sectional view taken along the line 5—5 of FIG. 1.

As may be best seen in FIG. 5, the fixed abutment 32 is suitably affixed to the backing plate 22 as by means of rivets 74. Alternatively, the fixed abutment 32 may be affixed to the backing plate 22 as by welding. However, a retaining spring 75 is also affixed to the fixed abutment 32 and overlies it. The retaining spring 75 has cantilevered end portions 76 that are engaged with the ends of the brake shoe webs 28 so as to hold the webs in engagement with the adjacent portion of the backing plate 22 to further assist in preventing twisting or cocking of the brake shoes 25 and 26.

The return spring intermediate portion 68 is provided with an arcuate portion 77 that is retained between a pair of pins 79 which are affixed to the backing plate 22 and may also assist in holding the fixed abutment 32 to the backing plate 22. It will be seen that the pins 79 have enlarged headed portions 81 (FIG. 10) that form a recess 82 in which the return spring arcuate portion 77 is retained. As a result, the return spring 33 and specifically its intermediate portions 68 is retained relative circumferentially and axially to the backing plate 22. However, the spring 33 is free to flex at this intermediate portion and thus is not clamped as with the prior art construction so as to significantly increase the spring rate. Also, the construction is such that the spring is not free to shift and alter the respective loading on the brake shoes 25 and 26. Due to the pivot location of the pin 79, the spring 75 is balanced thus insuring equal return spring force on the brake shoes 25 and 26.

Figure 10:
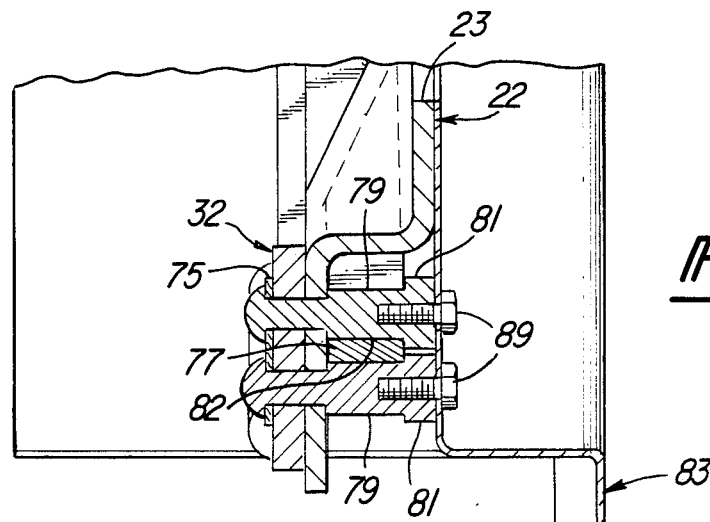
FIG. 10 is a cross-sectional view taken along line 10—10 of FIG. 9.

As may be best seen in FIGS. 2, 9 and 10, a dirt shield, indicated generally the reference numeral 83 is affixed to the backside of the backing plate 22. The dirt shield 83 has a re-entrant flange 84 that is adapted to receive a peripheral edge 85 of the brake drum 30, as shown in FIG. 2, so as to effect a relatively dirt-free assembly. The dirt shield 83 has a generally annular shape but is split at its ends along a generally Z-shaped cut 86 as shown in FIG. 9. It should be noted that the Z-shaped cut 86 causes one dirt shield end portion 87 to overlie one of the pins 79 while the other end portion 88 of the dirt shield 83 overlies the other of the end portion of the other pin 79. The pin end portions are tapped so as to receive machine screw 89 which pass through suitable openings in the dirt shield end portions 87 and 88 so as to permit attachment of the dirt shield 83 to the backing plate 22 via the pins 79. This results in a very convenient and easily assembled and disassembled construction.

Figure 13:
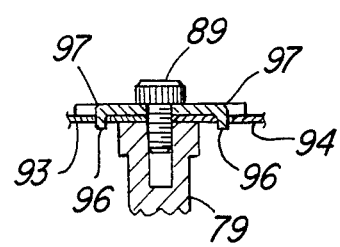
FIG. 13 is a cross-sectional view taken along the line 13—13 of FIG. 11.
Figure 11:
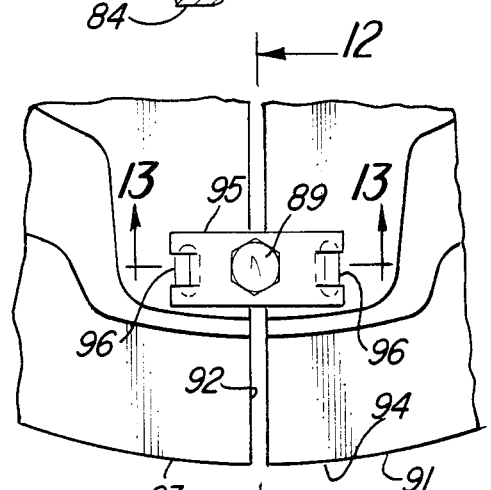
FIG. 11 is an elevational view, in part similar to FIG. 9, showing another embodiment of dirt shield mounting arrangement.
Figure 12:
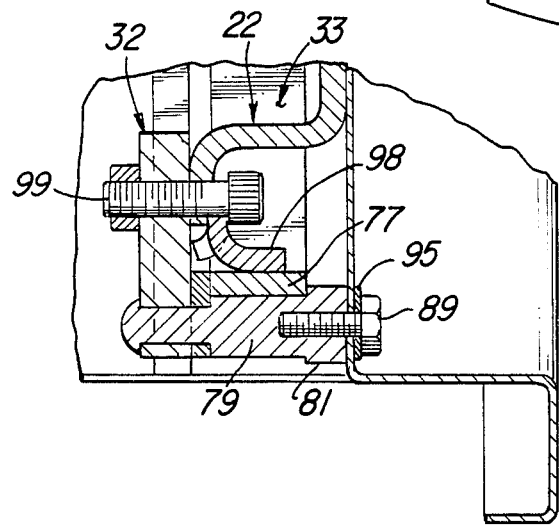
FIG. 12 is a cross-sectional view taken along the line 12—12 of FIG. 11.

In the embodiment of FIGS. 9 and 10, the dirt shield was split along an irregular or Z-shaped slot 86 so that each end cooperates with a respective end portion to affix the dirt shield to the backing plate 22. FIGS. 11 through 13 show another embodiment of the invention wherein a single fastener may cooperate with both ends of the dirt shield.

Referring now to this embodiment, the dirt shield is identified generally by the reference numeral 91 and is generally annular in shape and is split at its end portions. In this embodiment, however, the dirt shield 91 is split along a generally radially extending line 92 so that it is formed with facing end parts 93 and 94. In this embodiment, only one of the pins 79 is extended and forms a headed portion 81 that is tapped so as to receive a fastening screw 89. A retainer plate 95 underlies the screw 89 and has a pair of downturned tab portions 96 (FIG. 13) that extend into slot 97 formed in the dirt shield end portions 93 and 94 so as to locate the dirt shield 91.

Since only one of the pins 79 is employed, the return spring 33 is retained by means of this pin and a retainer plate 98 that is fixed relative to the backing plate 22 by means of a bolt and nut assembly 99, which also serves to hold the fixed abutment 32 in position. The retainer plate 98 overlies the spring portion 77 so as to retain it in position.

The actuator mechanism 31 for the brake shoes 25 and 26 will now be described primarily by reference to FIG. 14. It is to be understood that the actuator mechanism 31 is generally of the type shown in U.S. Pat. No. 4,380,277, entitled "Automatic Shock Adjusters For Vehicle Shoe-Drum Brakes", issued Apr. 19, 1983 in the names of Brian Ingram et al. Furthermore, an adjuster mechanism is associated with the actuator 31 and is generally of the type shown in co-pending application, Ser. No. 96,594, filed Sept. 11, 1987 in the name of Nigel Wrench, which patent and patent application are assigned to the assignee of this application. Although this type of actuator and adjuster mechanism is generally preferred, certain facets of the invention may be employed in connection with other types of brake actuating mechanisms, such as S-type cams, and/or with other types of other automatic adjuster mechanisms.

The actuator mechanism 31 is, as has been previously noted, comprised of the cam 34 which is rotatable about an axis defined by the camshaft 35. The cam 34 is provided with a pair of pockets 101 and 102 each of which receive respective ends of struts 103 and 104 which have a generally dumbbell shape. Each of the struts 103 and 104 cooperates with respective actuator tappets 105 and 106, respectively. The actuator tappets 105 and 106 are associated with the webs 27 of the brake shoes 25 and 26 and are slidably supported in bores 107 and 108, respectively, of the housing 54 for achieving brake actuation.

Each of the tappet 105 and 106 is of generally the same construction and is comprised of a first member 109 that is engaged at one end with the respective struts 103 or 104 and which have a male threaded end portion 111. The threaded portion 111 is received in an internally threaded bore 112 of a second tappet portion 113. The tappet portions 113 have a cylindrical outer configuration that is slidably supported in the respective bores 107 and 108 and has a slotted end part that receives the adjacent end of the brake shoe webs 28.

Because of the cooperation of the slotted end portions of the tappet parts 113 and with the brake shoe webs 28, the tappet portions 113 are held against rotation. The portions 109 are, however, rotatable so as to achieve adjustment for wear. An automatic adjusting mechanism is incorporated for achieving this adjustment and is comprised of an externally toothed part of the strut portions 109 which are engaged with gears 114 and 115, respectively. The gears 114 and 115 are affixed to a common adjuster shaft 116 so that equal adjustment and movement of the struts 105 and 106 will occur during brake operation and brake adjustment.

During normal operation of the brake and when no adjustment is required, the tappets 105 and 106 will reciprocate in the bores 107 and 108 and the gears 114 and 115 and shaft 116 will rotate in unison so that no relative rotation occurs between the tappet portions 109 and 113 while the shoes 25 and 26 move from the fully released position into contact with the drum 30. However, if excessive wear or clearance has developed, the shaft 116 will be held against further rotation and the locking of the gears 114 and 115 against rotation will affect rotation of tappet components 109 upon such excessive travel so as to cause the threaded connection 111 and 112 to extend and compensate for this wear.

The automatic adjusting mechanism, including those components already described, is indicated generally by the reference numeral 117 and will now be described by particular reference to FIGS. 14 and 15. The adjusting mechanism 117 further includes a bevel gear 118 that is affixed to the end of the shaft 116 at a point spaced from the gears 114 and 115. The bevel gear 118 is enmeshed with a bevel gear 119 that is fixed to the upper end of a shaft 121 which is journaled for rotation within the housing 34 about an axis that extends parallel to the axis of rotation of the camshaft 35.

The shaft 121 has affixed to it a cross pin 122 that is received with a clearance in a slot 123 formed at one end of a bushing 124. The bushing 124 is journaled on the shaft 121 but is connected for rotation with the shaft 121 by a lost motion connection defined by the pin 122 and slot 123. The amount of this lost motion and the play in the gears determines the normal shoe to drum clearance.

The lower end of the shaft 121 is journaled in a closure plug 125 that is fixed in a counterbore 126 formed at the lower end of a bore 125 into which the shaft 121 extends. The closure plug 125 is formed with a bore 128 that receives and journals the lower end of the shaft 121. An O-ring seal 129 effects a seal for the lower end of the counterbore 126. The closure plug 125 is retained within the bore 127 and counterbore 126 by means of a snap ring 131 or the like.

The closure plug 125 is formed with a cylindrical portion 132. The bushing 124 and cylindrical closure plug portion 132 have abutting faces 133 and 134, respectively, that are held in engagement by a coil compression spring 135 which encircles the shaft 121 and which bears against the upper end of the bushing 124 and against the bevel gear 119. The spring 135 loads the bevel gear 119 against the bevel gear 118 to eliminate undesirable clearance and also holds the hub of the bevel gear 118 against its supporting bearing (not shown).

A torsional spring clutch 136 encircles and frictionally engages the outer portion of the bushing 124 and closure plug portion 132 and has both low-torque and high-torque transmitting characteristics, as will become apparent.

The closure plug 125 has a key portion 137 that is received in a slot in the housing assembly 54 so that the closure 125 will be held against rotation. The coil compression spring 135 acting on the bushing 124 causes sufficient frictional force between the engaging surfaces 133 and 134 so as to prevent any rotation of the bushing 124 and, accordingly, the shaft 121 under vibrational forces. Also, the shaft 116 is normally held against rotation by the action of the spring 135.

The adjuster operates as follows. When the brakes are actuated by rotation of the lever 38, camshaft 35 and cam 34, the struts 103 and 104 will create an axial force on the tappets 105 and 106 and effect their movement outwardly. This will cause the brake shoes 25 and 26 to move against the action of the return spring 33. During this initial movement, the gears 114 and 115 will not rotate until the clearance of the gears 114 and 115 with the gears on the tappets 105 and 106 has been taken up. Thereafter, the shaft 116 will rotate as will the bevel gears 118 and 119 and shaft 121. As has been previously noted, the cooperation of the pin 122 and the slot 123 acts as a lost motion connection and the components will rotate to take up the normal clearance in the system. Assuming that no excessive wear has occurred as will require adjustment, the continued rotation of the cam 34 will cause the brake shoes 25 and 26 and more specifically their frictional linings 29 to move into engagement with the associated brake drum for braking its rotation. Upon continued outward movement of the brake shoe 25 and 26 due to drum deflection, brake component deflection and compression of the linings 29, the reaction load from the brake drum 30 increases at a high rate and the thread friction between the tappet components 109 and 113 exceeds the frictional torque between the spring 136 and the bushing 124 (high torque direction) and the shaft 116 will continue to rotate as will the shaft 121 and no relative rotation will occur between the tappet components 109 and 113. As a result, no adjustment will be effected.

When the brakes are released, the brake shoes 25 and 26 will be returned by the return spring 33 and this will force the tappets 105 and 106 to also be moved inwardly. During this return movement, the gears 114 and 115 and shaft 116 will be rotated in the opposite sense. This rotation is transmitted through the bevel gears 118 and 119 to the shaft 121 which is permitted to rotate through slippage of the bushing 124 relative to the spring 136 (low-torque direction) and the components will return to their original position without any relative rotation occurring between the tappet components 109 and 113.

Assuming that sufficient wear of the linings 29 has occurred as to require adjustment and after the aforenoted clearances have been taken up, the shaft 121 will rotate sufficiently before the linings 29 engage the brake drum so as to cause the pin 122 of the lost motion connection to engage the slot 123 of bushing 124. At this point, continued movement of the tappets 105 and 106 tend to cause the bushing 124 to rotate, however, the engagement of spring 136 with the closure member cylindrical portion 132 retains the shaft 121 against rotation in the high-torque direction. Hence, the shaft 116 will also be locked against rotation as will the gears 114 and 115. Therefore, continued axial movement of the tappets 105 and 106 will cause the tappet portions 109 to rotate relative to the tappet portions 113 and effect an elongation in the length of the tappets 105 and 106 sufficient to adjust for wear. Once the brake shoe linings 29 engage the brake drum 30 and the load between the shoes 25 and 26 and the drum 30 increases, the spring 136 will slip and no further adjustment will be effected. Return operation is the same as that previously described.

Another feature provided by spring 135 acting on bevel gears 119 and 118 is that the shoe to drum clearance can be changed by increasing the thickness of the cover gasket thereby changing the clearance between gears 114 and 115 and the teeth of tappet screws 109 without changing the mating of the bevel gears 118 and 119.

It should be noted that the portion of the shaft 121 that extends through the closure plug 125 is provided with a headed part 138 that permits manual rotation of the shaft 121 and shaft 116 for manual adjustment. This is normally done only in order to permit backing off of the tappets 105 and 106 for servicing of the brake.

A lubricating arrangement is further incorporated for lubricating the automatic adjuster as well as the actuating mechanism. Previously, it had been the practice to lubricate the actuating mechanism by removing a cover plate 139 that is affixed to the housing 54 by threaded fasteners with a gasket being interposed between these components. However, removal of the cover plate 139 raises the possibility of foreign material entering the actuating mechanism and causing damage and/or improper assembly.

In accordance with the invention, the entire mechanism is lubricated by means of a single grease or lubricant fitting 141 (FIG. 2) that is provided in the exposed end of the tubular member 36. Grease or lubricant can be entered into the clearance between the camshaft 35 and the tubular member 36 through this fitting. This grease can flow axially and enter the housing 54 past grooves in the bushing 62 so as to lubricate the actuating mechanism 31 contained therein. In addition, the lubricant can flow down into the adjuster mechanism as shown in FIG. 15. A one-way check valve 142 is provided at the lower end of the shaft 121 so as to permit the excess lubricant to exit via this fitting. In addition, lubricant can exit the cam shaft portion through the seal 63. However, it is preferred that the seal 63 will open at a higher pressure than the one-way check valve 142 so that grease will first exit through the check valve 142.

The effective cross-sectional area of the lubricant inlet fitting 141 is substantially less than the relief area provided for by the area of the one-way check valve 142 and the seal 63. As a result, it is ensured that there will not be an undesirable pressure increase in the internal volume of the actuator mechanism during lubrication with normal lubricating equipment.

The chamber formed by the cover plate 139 and housing 54 has at least a portion of it filled with a closed cell foam 143 which will be compressed upon lubricant introduction. As a result, the changes in variation in volume which occur during the movement of the tappets 105 and 106 will not tend to draw air and contaminants into the system but will merely cause the foam material 143 to expand and contract and ensure that air and contaminants cannot enter the system and full lubricant is maintained at all times. Also, the foam material prevents a hydraulic lock from developing as could occur if the entire mechanism within the housing 54 was filled with lubricant.

From the foregoing description, it should be readily apparent that an improved and simplified arrangement has been incorporated for ensuring lubrication of the brake actuating mechanism without necessitating opening of the brake housing. In addition, the automatic adjusting mechanism is also lubricated by the same system. The system also includes a device which prevents lubricant from being forced from the system when the effective volume of the actuator housing decreases and to avoid the introduction of air when the volume increases.

It should be understood that the foregoing description is that of the preferred embodiments of the invention and that various changes and modifications may be made without departing from the spirit and scope of the invention as defined by the appended claims.

I claim:

1. An actuator mechanism for a drum brake or the like comprising a backing plate adapted to be fixed relative to a rotating component to be braked, a tubular member fixed relative to said backing plate, a camshaft supported for rotation within said tubular member, an actuator housing fixed at one end to said tubular member and defining an internal cavity in communication with the interior of said tubular member, cam means fixed to said camshaft and extending at least in part to said actuator housing cavity, actuating means movably supported within said actuator housing and adapted to actuate an associated brake shoe, means for admitting lubricant into said cavity and into the interior of said tubular member around said camshaft for lubrication of said actuating means, said cam and said camshaft, a relief opening for permitting air and lubricant to escape from said actuator housing cavity and said tubular member upon pressure lubrication, the effective volume of said actuator housing and said tubular member interior varying during brake operation, and an expansible member for preventing the escape of lubricant during contraction of said effective volume and for precluding the entry of air during expansion of said effective volume.

2. An actuator mechanism for a drum brake or the like as set forth in claim 1 wherein the means for admitting lubricant comprises a grease fitting.

3. An actuator mechanism for a drum brake or the like as set forth in claim 2 wherein the relief opening has a greater effective area than the area of the grease fitting.

4. An actuator mechanism for a drum brake or the like as set forth in claim 2 wherein the grease fitting is carried by the tubular member.

5. An actuator mechanism for a drum brake or the like as set forth in claim 4 wherein the relief opening further comprises the opening formed between an open outer end of the tubular member and the camshaft for further including a lip seal for sealing the opening and for opening under pressure.

6. An actuator mechanism for a drum brake or the like as set forth in claim 1 wherein the expansible member is positioned within the actuator housing cavity.

7. An actuator mechanism for a drum brake or the like as set forth in claim 5 wherein the lip seal has a greater effective area than the grease fitting.

8. An actuator mechanism for a drum brake or the like as set forth in claim 1 further including automatic adjuster means for adjusting for wear of the associated brake shoes and comprising adjuster components contained within an adjuster housing cavity that communicates with the actuator housing cavity.

9. An actuator mechanism for a drum brake or the like as set forth in claim 8 wherein the relief opening is formed in the actuator housing.

10. An actuator mechanism for a drum brake or the like as set forth in claim 9 wherein the means for admitting lubricant comprises a grease fitting.

11. An actuator mechanism for a drum brake or the like as set forth in claim 10 wherein the relief opening has a greater effective area than the area of the grease fitting.

12. An actuator mechanism for a drum brake or the like as set forth in claim 10 wherein the grease fitting is carried by the tubular member.

13. An actuator mechanism for a drum brake or the like as set forth in claim 12 wherein the relief opening further comprises the opening formed between an open outer end of the tubular member and the camshaft and further including a lip seal for sealing the opening and opening under pressure.

14. An actuator mechanism for a drum brake or the like as set forth in claim 13 wherein the lip seal opens at a greater pressure than the relief opening in the actuator housing.

15. An actuator mechanism for a drum brake or the like comprising a backing plate adapted to be fixed relative to a rotating component to be braked, a tubular member fixed relative to a torque plate, a camshaft supported for rotation within said tubular member, an actuator housing fixed at one end to said tubular member and defining an internal cavity communicating with the interior of said tubular member, cam means fixed to said camshaft and extending at least in part into said actuator housing cavity, actuator means movably supported within said actuator housing and adapted to actuate an associated brake shoe, the effective volume of said cavity and the interior of said tubular member changing during operation of the brake, and an expansible member contained within said volume for precluding the escape of lubrication upon contraction of the said effective volume and precluding the entry of air upon expansion of the effective volume.

16. An actuator mechanism for a drum brake or the like as set forth in claim 15 wherein the expansible member is positioned within the said actuator housing cavity.

17. An actuator mechanism for a drum brake or the like as set forth in claim 16 further including automatic adjuster means for adjusting for wear of the associated brake shoes and comprising adjuster components contained within an adjuster housing cavity that communicates with the actuator housing cavity.

* * * * *